US008555345B2

(12) United States Patent
Torvinen et al.

(10) Patent No.: US 8,555,345 B2
(45) Date of Patent: Oct. 8, 2013

(54) USER AUTHENTICATION AND AUTHORISATION IN A COMMUNICATIONS SYSTEM

(75) Inventors: Vesa Matti Torvinen, Turku (FI); Vesa Petteri Lehtovirta, Espoo (FI); Monica Wifvesson, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1513 days.

(21) Appl. No.: 11/883,158

(22) PCT Filed: Jan. 28, 2005

(86) PCT No.: PCT/EP2005/050372
§ 371 (c)(1),
(2), (4) Date: Jun. 17, 2008

(87) PCT Pub. No.: WO2006/079419
PCT Pub. Date: Aug. 3, 2006

(65) Prior Publication Data
US 2009/0013381 A1    Jan. 8, 2009

(51) Int. Cl.
*H04L 29/06*    (2006.01)
(52) U.S. Cl.
USPC ............ 726/4; 726/3; 713/168; 713/171; 380/247; 380/248; 380/278
(58) Field of Classification Search
USPC .......... 455/410, 411; 726/3, 4; 380/247, 248, 380/278
See application file for complete search history.

(56) References Cited

U.S. PATENT DOCUMENTS

| 5,537,474 | A  | * | 7/1996 | Brown et al. | 380/248 |
| 5,596,641 | A  | * | 1/1997 | Ohashi et al. | 380/248 |
| 7,254,237 | B1 | * | 8/2007 | Jacobson et al. | 380/277 |
| 7,966,646 | B2 | * | 6/2011 | Chou et al. | 726/2 |
| 7,987,366 | B2 | * | 7/2011 | Blom et al. | 713/171 |
| 2002/0012433 | A1 | * | 1/2002 | Haverinen et al. | 380/247 |

OTHER PUBLICATIONS

International Search Report mailed Aug. 26, 2005.
Written Opinion dated Aug. 26, 2005.
International Preliminary Report on Patentability mailed Apr. 23, 2007.
N. Asokan et al.: "Man-in-the-Middle in Tunneled Authentication Protocols," Nokia Research Center, 'Online! 2003, XP002344223 pp. 2-7.

* cited by examiner

*Primary Examiner* — Brandon Hoffman
*Assistant Examiner* — Thomas C Lauzon
(74) *Attorney, Agent, or Firm* — Nixon & Vanderhye P.C.

(57) ABSTRACT

A method of authenticating a client to two or more servers coupled together via a communications network, wherein the client and a first server possess a shared secret. The method comprises authenticating the client to a first server using said shared secret, signalling associated with this authentication process being sent between the client and said first server via a second server, generating a session key at the client and at the first server, and providing the session key to said second server, and using the session key to authenticate the client to the second server.

19 Claims, 2 Drawing Sheets

USER AUTHENTICATION AND AUTHORISATION IN A COMMUNICATIONS SYSTEM

This application is the U.S. national phase of International Application No. PCT/EP2005/050372 filed 28 Jan. 2005 which designated the U.S., the entire contents of which are hereby incorporated by reference.

TECHNICAL FIELD

The technology relates to user authentication and authorisation in a communications system and in particular, though not necessarily, to a method and apparatus for authenticating and authorising a user to a network application function of a communications system.

BACKGROUND

Existing second generation cellular radio communication systems such as GSM are in the process of being supplemented and to some extent replaced by third generation systems. These include the 3G system known as Universal Mobile Telecommunications System (UMTS). Security is a key component of the UMTS standards and is intended to be superior to second generation system security, whilst at the sane time ensuring compatibility with GSM to ease both migration from GSM to UMTS and handover between GSM and UMTS access networks. The design of the authentication and key agreement (AKA) protocol for UMTS (see 3G TS 33.102) is intended to satisfy these objectives, at least with respect to authenticating subscribers to an access network and securing user data over the radio link.

The AKA protocol involves three communicating parties, namely the authentication centre (AuC) in the home environment (HE) of the user, the visitor location register (VLR) in the serving network (SN) of the user, and the user itself, represented by his or her UMTS subscriber identity module (USIM). A secret key is shared by the AuC and the USIM. Following receipt of an authentication data request by the HE, the AuC generates an array of (n) authentication vectors. This array is then sent to the SN and is good for n authentication attempts by the user. The SN selects the next vector in the array, and sends certain components of the vector to the USIM. These allow the USIM to verify the SN, compute session keys, and generate a response. The latter is returned to the SN which compares it with an expected response contained in the chosen vector. If they match, the SN assumes the authentication exchange to have been successfully completed. The established session keys are then transferred by the USIM to the user's mobile equipment and by the VLR to the serving radio network controller (RNC) of the UMTS radio access network (UTRAN), allowing the ciphering of data transferred over the radio link.

There are occasions when authorisation and authentication are required at the application level, rather then just at the network level. In some cases, ciphering of data at the application layer may also be desirable or even necessary. One might consider for example the case where encrypted video data is "broadcast" from a web server to subscribers of the broadcast service. Subscribers must first authenticate themselves to the web server, and are thereafter provided with a key for decrypting the broadcast data. Rather than providing a wholly separate mechanism for facilitating such application layer security, proposals have been made to allow this security to be "bootstrapped" on the 3GPP authentication infrastructure including the AuC, USIM, and 3GPP AKA protocol. This approach anticipates, at least initially, that the application function on the network side is under the control of the access network operator, although this need not be the case if some other trust relationship exists between the access network operator and the operator of the network where the application function is located.

3GPP TS 33.220 describes a generic bootstrapping architecture (GBA) mechanism for bootstrapping authentication and key agreement procedures for application security on the 3GPP AKA mechanism. The new procedure introduces a network based function known as the bootstrapping server function (BSF) which is located in the HE of a user. The BSF communicates with the AuC, that is the home subscriber subsystem (HSS), to obtain, upon request, authentication vectors. The interface between the BSF and the HSS is known as the Zh interface. The functional entity which implements the application function on the network side is referred to as the network application function (NAF). The NAF communicates with the BSF via the Zn interface (using for example the DIAMETER protocol). The interfaces between the user equipment (UE) and the BSF and NAF are referred to as the Ub and Ua interfaces respectively, and utilise the hypertext transfer protocol (HTTP).

Assuming that a UE establishes that the GBA is to be used with a given NAF, and that the necessary keys do not yet exist, the UE must initiate the HTTP Digest AKA mechanism with the BSF over the Ub interface. (As part of this process, the BSF may modify the vectors obtained from the HSS.) As a result, the UE is authenticated by the BSF and is provided with the necessary security keys. In addition, the UE is provided with a transaction identifier (TI). This TI is then provided by the UE to the NAF over the Ua interface. The NAF sends the TI to the BSF and receives in return the associated security keys. The UE and the NAF can then use the Ua interface in a secure way.

Whilst it is not expected that use of the Ub interface will be frequent (n.b. the same keying material can be re-used with several different NAFs, each new NAF requesting keying material from the BSF using the common TI), when it is used it is time consuming. For example, ten round trips are involved assuming that HTTP Digest is used on the Ua interface. Furthermore, the UE must make use of two separate transport layer connections in order to communicate with both the NAF and the BSF, resulting in a high level of transport layer resources.

SUMMARY OF THE INVENTION

It is an object to overcome or at least mitigate the above noted disadvantages. These objects are achieved by effectively combining the two interfaces into a single interface, allowing multiple authorisation and authentication procedures to be run in parallel.

According to a first aspect, a method authenticates a client to two or more servers coupled together via a communications network, wherein the client and a first server possess a shared secret, the method comprising:

authenticating the client to a first server using said shared secret, signalling associated with this authentication process being sent between the client and said first server via a second server;

generating a session key at the client and at the first server, and providing the session key to said second server; and using the session key to authenticate the client to the second server.

Preferably, the method comprises authenticating the second server to the first server, and providing said session key from the first server to the second server after this authentication.

A second aspect provides a method of operating an authentication server within a communications system, the method comprising:

relaying authentication signalling between a client and a further authentication server, the client and said further authentication server sharing a secret; and receiving a session key from said further authentication server, and using the session key to authenticate the client.

A third aspect provides a method of operating an authentication server within a communications system, the method comprising:

exchanging signalling with a client via a further server for the purpose of authenticating the client terminal;

generating a session key using a secret shared between the client and said first server; and sending the session key to said second server.

A fourth aspect provides a method of operating a client terminal coupled to a communication network, the method comprising:

exchanging signalling with a first server via a second server for the purpose of authenticating the client terminal to said first server;

generating a session key using a secret shared between the client terminal and said first server; and receiving an authentication challenge from said second server, and generating a challenge response using said session key.

The steps of the inventive method need not be carried out in the order specified. In particular, the method steps may overlap.

A fifth aspect provides a method of authenticating a client to two or more servers coupled together via a communications network, wherein the client and a first server possess a shared secret, the method comprising:

sending an authentication request from the client to said first sever via a second server;

upon receipt of said request at the first server, generating a first authentication challenge using said shared secret, and sending the challenge to the second server;

forwarding the first challenge to the second server, generating a second authentication challenge at the second server, and sending the first and second challenges from the second server to the client;

upon receipt of the challenges at the client, generating a first challenge response to the first challenge, and a session key, using the shared secret, and generating a second challenge response to the second challenge using the session key;

sending said challenge responses to said second server, and forwarding the first challenge response to the first server;

authenticating the client at the first server using the first challenge response and said shared secret, and, in the event that the client is authenticated, generating said session key at the first server and sending this to the second server; and authenticating the client at the second server using the second challenge response and said session key.

A sixth aspect provides a method of authenticating user equipment to a network application function of a communications network, the method comprising:

sending an access request from the user equipment to the network application function;

determining at the network application function that the request relates to an authentication which must be performed by some other function within the network;

forwarding the request to said other function;

returning a challenge from said other function to the network application function;

sending the said challenge together with a challenge generated by the network application function to the user equipment;

sending challenge responses from the user equipment to the network application function, and forwarding the response relating to the challenge of said other function, to that other function; and verifying the validity of the responses at the network application function and at said other function.

A seventh aspect provides a method of authenticating a client to two or more servers coupled together via a communications network, wherein the client and a first server possess a shared secret, the method comprising:

sending an authentication request from a client to an authentication server, the request including an authenticating header identifying a domain other than that in which the authentication server is located;

at said authentication server, recognising that the request is directed to another domain and forwarding the authentication header to an authentication server of that domain; and upon receipt of the authentication request at the second mentioned authentication server, authenticating the first mentioned authentication server, authenticating the client, and providing to the first mentioned authentication server means, for authenticating the client.

Reference above to the authentication or access request being forwarded to the further server from the intermediate server, encompasses the forwarding of the entire request message as received, or forwarding only a part thereof. It also covers the possibility that the request is converted from the received format to a different format. It is only important that the nature of the request is preserved.

Other aspects relate to user equipment and authentication servers for use in this method.

DETAILED DESCRIPTION OF EXAMPLE EMBODIMENTS

A "parallel" authentication mechanism is provided for a user and/or user device, where the credentials for a second authentication procedure are derived from the credentials of a first authentication procedure before the first authentication procedure is completed. The second authentication procedure is then completed upon completion of the first authentication procedure.

Figure 1:
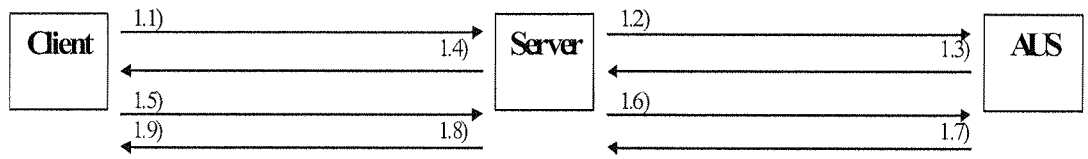
FIG. 1 illustrates the flow of signalling associated with a parallel authentication procedure in the general case.

A client and an authentication server (AUS) share a secret S. The client contacts a (second) server and that server must authenticate the client. However, the server does not share its own credentials with the client. The client, the server and the AUS agree that the existing secret S shall be re-used. FIG. 1 shows the signalling steps involved in the process.

1.1) The client sends a request to the server. The request includes authentication method specific information indicating that the server may re-use the secret S, held by the AUS, to authenticate the client.

1.2) The server recognises that information from the AUS can be re-used, and forwards the authentication method specific information to the AUS. The server and the AUS mutually authenticate each other at the beginning of the communication.

1.3) If the AUS decides to co-operate with the server, the AUS generates an AUS-challenge, and forwards the challenge to the server.

1.4) The server relays the AUS-challenge (the first authentication method) to the client, and appends its own server-challenge (the second authentication method). At this stage the server can remain stateless in respect of the client.

1.5) The client receives the two challenges. It prepares a response to AUS-challenge using the shared secret S. The client then derives server specific key material from the secret S in order to prepare a response to the second challenge. The client requires mutual authentication from the server in order to be sure that the server possesses the same key. This will prove to the client that the AUS trusts the server, and has provided the derived key to the server. The client sends both the AUS-response and the server-responses to the server.

Depending on the nature of the first authentication method, the client may be able to authenticate the AUS at this stage. For example, this is possible with UMTS AKA, EAP AKA and HTTP Digest AKA mechanisms. This may alternatively be carried out at step 1.9) below.

1.6) The server stores the server response, and tunnels the AUS-response to AUS. At the same time the server requests server specific key material (derived from the secret S) related to the server-challenge.

1.7) The AUS authenticates the client using the AUS-response and shared secret S. It then prepares the same key material from S that the client did in step 1.5), and sends this key material to the server. The AUS may also specify a lifetime for this new key material, and provide this to the server. If authentication of the client fails, the AUS does not return the key material, but replies with an authentication failure message.

1.8) The server authenticates the client using the server-response from step 6) and the received key material from step 1.7). If the authentication is successful, the server will deliver the service to client.

1.9) The client authenticates the server using the server-response and key material derived from S. Depending on the nature of the first authentication method, the client may also authenticate the AUS at this stage. For example, this would be the case with HTTP Digest, where the client requires the response message (e.g. 200 OK) to include Authentication-Info header in order to authenticate the AUS.

The Client and the AUS may have static policies on the length of time for which the derived keys remain valid. This policy may be configured at the client at the same time as the secret S is specified. There may however be other ways to agree on the key lifetime, e.g. to encode it in some parameter in the authentication messages.

It is noted that, in this general case, it is difficult to specify if the client identity is re-used, or re-generated. Identity agreement will depend upon the specific application.

Figure 2:
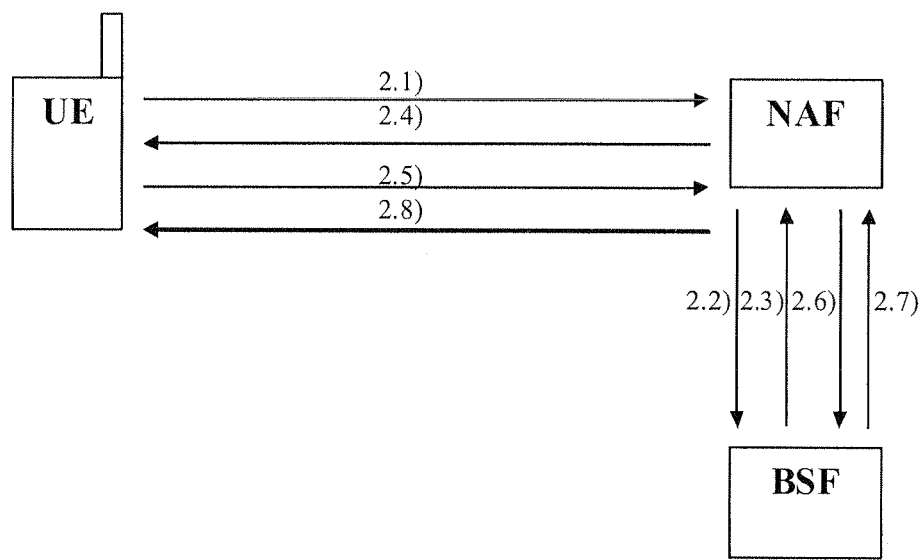
FIG. 2 illustrates the flow of signalling associated with a parallel authentication procedure applied to a Generic Bootstrapping Architecture.

A first example implementation will now be described with reference to FIG. 2 which illustrates a subscriber owned 3G mobile terminal (UE) which communicates with some radio access network (not shown in the Figure). It is assumed here that the UE has already been authenticated to the radio access network and authorised to use the services provided by that network using the 3GPP AKA procedure (involving an exchange of signalling between a serving node of the access network and an authentication server of the subscriber's home environment, as described above). Also illustrated in FIG. 2 are a network authentication function (NAF) and a bootstrapping server function (BSF). The location of the NAF is not important for the purpose of this discussion, although it may be, for example, operated and controlled by the operator of the radio access network. The BSF is typically located within the home environment of the subscriber. As already described, the UE communicates with the NAF via the Ua interface, and with the BSF via the Ub interface.

Assume that the subscriber owning the terminal UE wishes to make use of a service, access to which is controlled by the NAF. This service may be a real-time or streaming video broadcast from a web server. Typically, the NAF will need to know that the subscriber is who he claims to be, and that a billing relationship can be established for the subscriber. To do this, the NAF must contact the home environment of the subscriber. A procedure which is simplified significantly over the conventional approach will now be described. This procedure takes as its basis the 3GPP GBA standards TS 33.220 (v6.2.0) and TS 24.109 (v6.0.0).

The optimised procedure assumes that the hypertext transfer protocol HTTP is used in the Ua interface, although other protocols may also be possible. The procedure has the following steps:

2.1) The UE sends a HTTP request (typically HTTP GET) over the Ua interface to the NAF. If the UE supports the GBA optimisation procedure, it shall include the authorisation header that it uses in the Ub interface, into this HTTP message. This authorisation header contains a user identity and the "realm" of BSF. For privacy reasons, the user identity may not be the usual Ub interface related identity (IMSI or IMPI). Rather, the identity may be a previously valid Ua interface related identity, i.e. B-TID. The request may also include other authorisation headers, in particular an authorisation header directed to the NAF.

The UE may decide to attempt use the GBA optimisation procedure for example if the lifetime of certain security keys is about to expire, or by default if the UE does not know if the GBA procedure should be used or not.

2.2) In the event that HTTP request includes the authorisation header used in the Ub interface, the NAF will recognize that this header is for a realm other than itself. Based on the header information, the NAF may forward the header information or relevant parts thereof to the BSF via the Zn interface using, for example, the DIAMETER protocol.)

If the NAF does not support GBA optimisation, it should ignore the authorisation header because it is for some other realm. Even if the NAF does support GBA optimisation, the NAF may still make a policy decision not to use GBA optimisation. [Note that in this case, the NAF would directly challenge the UE with an HTTP 401 authentication challenge, assuming that the UE and the NAF share a valid password.] The NAF may also reply with a message that initiates the bootstrapping procedure via the Ub interface.

Upon receipt of the HTTP protocol information from the NAF, the BSF checks whether or not the NAF is authorised to use the optimised GBA procedure. For example, the BSF may authenticate the NAF using TLS, checking the authorisation data from a local database.

2.3) If so, then the BSF returns an HTTP Digest AKA challenge to the NAF within a DIAMETER protocol message. The challenge includes a new identity for the UE, B-TID2, e.g. in nonce parameter. It is also possible for the challenge to include only a "hint" on how the UE can construct B-TID2, with the BSF and the UE knowing the rules for constructing the identity from the hint. The BSF is able to relate the B-TID back to the IMSI/IMPI of the subscriber, and thereby choose the correct AKA challenge.

2.4) The HTTP 401 response message from the NAF towards the UE includes two authentication challenges, one from the BSF, and another from the NAF. N.B. At this stage, the NAF can remain stateless, i.e. it can "forget" the UE.

2.5) The UE uses the Digest AKA challenge (originated at the BSF) to authenticate the home network. The UE generates new GBA related keying material based on the HTTP Digest AKA challenge and other relevant information. The UE then uses the B-TID2 and related keying material to construct NAF specific keys, and uses this information to generate a response to the second authentication challenge (towards the NAF). A second HTTP request is sent by the UE towards the NAF and includes two authorisation headers, one for the NAF and another for the BSF.

2.6) The NAF "tunnels" the AKA response (i.e. BSF authorisation header) to the BSF. At the same time, it requests the keying material related to the B-TID2 identity.

2.7) The BSF authenticates the UE according to the Digest AKA procedure. It then constructs the same keying material as the UE (step 2.5), and returns the relevant keys to the NAF. If AKA authentication fails, the BSF returns an error message to the NAF.

2.8) In the event that the NAF receives appropriate keying material from the BSF, the NAF is able to authenticate the UE using the second authorisation header contained in the second HTTP request [step 2.5)]. The NAF then facilitates delivery of the requested service to the UE.

An alternative parallel authentication mechanism will now be described, first in general terms and then in respect of a detailed implementation.

Figure 3:
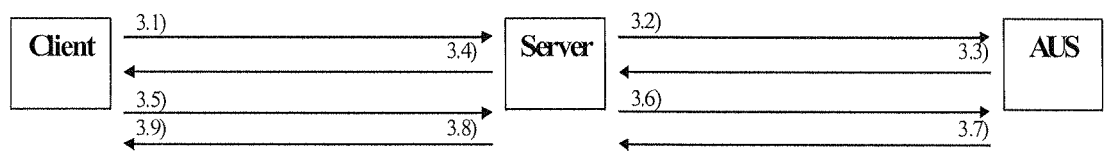
FIG. 3 illustrates the flow of signalling associated with a modified parallel authentication procedure in the general case.

FIG. 3 illustrates components of a communication system as already described, where the client and authentication server (AUS) share a secret S. Steps 3.1) to 3.3) are the same as those described above with reference to FIG. 1. However, at step 3.4), after the server has received the AUS challenge to the client, it forwards this to the client without appending any challenge of its own.

The client receives the challenge, and derives server specific key material from the shared secret S and uses this to prepare a response to the AUS challenge. The client requires mutual authentication from the AUS using server specific key material (derived from S). This will prove to the client that the AUS trusts the server, and therefore derived server specific key material from S. The client sends the AUS-response to the server at step 3.5). As with the procedure of FIG. 1, depending on the nature of the first authentication method, the client may already be able to authenticate the AUS at this stage.

At step 3.6), the server tunnels the AUS response to the AUS, whilst itself retaining a copy of the response. At the same time, the server requests server specific key material (derived from S) from the AUS. Whilst the server does not need this key material in the ongoing authentication procedure, it may be used to authenticate the client in the future.

The AUS prepares the same key material from the shared secret S that the client prepared in step 3.5), and authenticates the client using the AUS response and the derived key material. The AUS prepares an authentication reply using the server specific key material and sends this to the server at step 3.7). The AUS indicates to the server that the client is authenticated and sends the key material to the server. Again, the AUS may specify a lifetime for the new key material, and provides this to the server. If the authentication of the client fails, the AUS does not return key material, but replies with an authentication failure message. Note that it is also possible that the AUS does not prepare the authentication reply, but instead returns the key material to the server, allowing the server to prepare the authentication reply.

The server receives the authentication indication and key material from the AUS. If the authentication was successful, the server will deliver the service to the client. The server forwards the authentication reply to the client at step 8). The server is able to test the AUS response sent by the client in step 3.5) using the keys that were returned by the AUS (although this is not necessary as the server may rely upon the authentication provided by the AUS).

At step 3.9) the client authenticates the server using the authentication reply and key material derived from the shared secret S. This will prove to the client that the AUS trusts the server. Depending on the nature of the authentication method, the client may also authenticate the AUS at this stage. For example, this would be the case when using the HTTP Digest mechanism.

Figure 4:
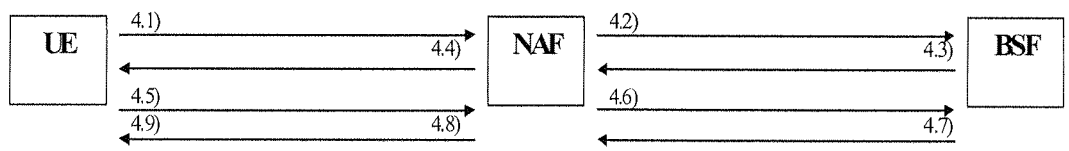
FIG. 4 illustrates the flow of signalling associated with the modified parallel authentication procedure applied to a Generic Bootstrapping Architecture.

A detailed implementation of this general procedure assumes that HTTP is used in the Ua interface. The procedure is illustrated in FIG. 4. Steps 4.1) to 4.3) are as described above with reference to FIG. 2. However, at step 4.4), the NAF forwards the 401 response message towards the UE, including the authentication challenge from the BSF but without any challenge generated by the NAF.

The UE uses the Digest AKA challenge (from the BSF) to authenticate the BSF. The UE generates new GBA related keying material based on the HTTP Digest AKA challenge and other relevant information. The UE uses this keying material and other relevant information (e.g. the identity of the NAF) to derive NAF specific keys, and then uses the NAF specific keys as a password when preparing the HTTP Digest AKA response towards the BSF. The UE includes a client nonce in the HTTP Digest AKA response and sends the response towards the NAF at step 4.5).

Note that this UE behaviour violates a standard operations on RFC 3310 (HTTP Digest AKA) when responding to the HTTP Digest AKA challenge. The password used in HTTP Digest AKA should be "RES", and not a NAF specific key. However, this exceptional procedure guarantees that the NAF identity is tied to the authentication procedure.

At step 4.6), the NAF tunnels the AKA response to the BSF. At the same time, the NAF requests the keying material related to the UE (identified by for example an IMSI/IMPI or new B-TID). The BSF constructs the same NAF specific keying material as the UE did at step 4.5). The BSF then authenticates the UE (Digest AKA response) using the NAF specific keys. The BSF prepares a 200 OK message using the NAF specific keys and client nonce, and sends this to the NAF at step 4.7). The message may include a new identity for the UE, i.e. B-TID2. It is also possible that the message may include only a hint as to how the UE can construct the identity B-TID2 [the new identity may be allocated in step 4.3) or step 4.7)].

The BSF also sends the relevant keys to the NAF, together with a notification that the UE has been successfully authenticated. If the NAF has not yet seen the new identity B-TID2, the BSF also returns that information to the NAF. If AKA authentication fails, the BSF returns an error message to the NAF.

At step 4.8), the NAF forwards the 200 OK message to the UE. The NAF stores the NAF specific keys, e.g. to authenticate the UE in the case of a subsequent access request. The NAF is now ready to deliver the service to the UE. At step 4.9), the UE is able to authenticate the NAF based upon its receipt of the 200 OK message and NAF specific keys. This is possible since the BSF has also derived NAF specific keys and the UE has authenticated the BSF, hence indirectly authenticating the NAF.

It will be appreciated by the person of skill in the art that various modifications may be made to the above described embodiments without departing from the scope of the claims.

The invention claimed is:

1. A method of authenticating a client to two or more servers coupled together via a communications network, wherein the client and a first server possess a shared secret, the method comprising:
    sending an authentication request from the client to said first server via a second server;
    upon receipt of said request at the first server, generating a first authentication challenge using said shared secret, and sending the challenge to the second server;
    generating a second authentication challenge at the second server, and sending the first and second challenges together from the second server to the client;
    upon receipt of the challenges at the client, generating a first challenge response to the first challenge, and a session key, using the shared secret, and generating a second challenge response to the second challenge using the session key;
    sending said challenge responses together to said second server, and forwarding the first challenge response to the first server;
    authenticating the client at the first server using the first challenge response and said shared secret, and, in the event that the client is authenticated, generating said session key at the first server and sending this to the second server; and
    authenticating the client at the second server using the second challenge response and said session key.

2. A method according to claim 1, the method comprising authenticating the second server to the first server, and providing said session key from the first server to the second server after this authentication process.

3. A method according to claim 1, wherein one or both of the steps of authenticating the client to a first server and authenticating the client to the second server use an HTTP Digest protocol.

4. A method according to claim 3, wherein said HTTP Digest protocol is the HTTP Digest AKA protocol.

5. A method according to claim 3, wherein HTTP Digest information is tunnelled between the first and second servers using another protocol.

6. A method according to claim 5, wherein said other protocol is DIAMETER.

7. A method according to claim 6, the client authenticating the first server using said first authentication challenge.

8. A method according to claim 6, the client authenticating the second server upon receipt of said second authentication challenge.

9. A method according to claim 1, comprising authenticating the first and/or second server to the client.

10. A method according to claim 1, wherein said communication system comprises a radio access network, and said client or communication equipment is a mobile radio communication terminal.

11. A method of operating an authentication server within a communications system, the method comprising:
    relaying authentication signalling between a client and a further authentication server, the client and said further authentication server sharing a secret, the authentication signalling comprising a first authentication challenge sent from said further authentication server to the client and a first challenge response sent from the client to the further authentication server;
    generating a second authentication challenge and sending this to the client together with said first authentication challenge, and receiving from the client a second challenge response together with said first challenge response; and
    receiving a session key from said further authentication server, and using the session key and said second challenge response to authenticate the client.

12. A method according to claim 11, said authentication server being a Network Authentication Function communicating with a client via a Ua interface, and with a further authentication server via a Zn interface.

13. An authentication server suitable for use in a communications network and comprising:
    a relay configured to relay authentication signalling between a client and a further authentication server, the authentication signalling comprising a first authentication challenge sent from further authentication server to said client and a first challenge response sent from the client to the further authentication server;
    a data processor configured to generate a second authentication challenge, a sender for sending this to the client together with said first authentication challenge, and a receiver for receiving from the client a second challenge response together with said first challenge response;
    the receiver configured to receive a session key from said further authentication server following authentication of the client by said further authentication server; and
    the data processor configured to use the session key and said second challenge response to authenticate the client.

14. A server according to claim 13, the server being a Network Authentication Server.

15. A server according to claim 14, said relay being arranged to determine that an access request received from the client relates to an authentication which must be performed by some other function within the network, and to relay the request to the further server accordingly.

16. A method of operating a client coupled to a communication network, the method comprising:
    exchanging signalling with a first authentication server via a second authentication server for the purpose of authenticating the client to said first server, the authentication signalling comprising a first authentication challenge sent from said first authentication server to said client and a first challenge response sent from the client to the first authentication server;
    generating a session key using a secret shared between the client and said first server; and
    receiving a second authentication challenge from said second server together with said first authentication challenge, and generating a second challenge response using said session key and sending this to the second server together with said first challenge response.

17. A method according to claim 16, the client being a mobile radio communications terminal.

18. A client terminal comprising:
    processing and communication circuitry configured to signal with a first authentication server via a second authentication server for the purpose of authenticating the client to said first server, the authentication signalling comprising a first authentication challenge sent from said first authentication server to said client and a first challenge response sent from the client to the first authentication server;

the processing circuitry configured to generate a session key using a secret shared between the client and said first server; and the communication circuitry configured to receive a second authentication challenge from said second authentication server together with said first authentication challenge, and the processing circuitry configured to generate a second challenge response using said session key and for sending this to the second authentication server together with said first challenge response.

19. A method of authenticating user equipment to a network application function of a communications network, the method comprising: sending an access request from the user equipment to the network application function;

determining at the network application function that the request relates to an authentication which must be performed by some other function within the network;

forwarding the request to said other function; returning a challenge from said other function to the network application function; sending the said challenge together with a further challenge of the network application function to the user equipment;

sending challenge responses together from the user equipment to the network application function, and forwarding the response relating to the challenge of said other function, to that other function; and verifying the validity of the responses at the network application function and at said other function;

wherein the user equipment and said other function share a secret, and derive a session key from that secret during the authentication procedure, said function providing the session key to the network application function, and the user equipment using the session key to generate the said second challenge response.

* * * * *

UNITED STATES PATENT AND TRADEMARK OFFICE
CERTIFICATE OF CORRECTION

| | | |
|---|---|---|
| PATENT NO. | : 8,555,345 B2 | Page 1 of 1 |
| APPLICATION NO. | : 11/883158 | |
| DATED | : October 8, 2013 | |
| INVENTOR(S) | : Torvinen et al. | |

It is certified that error appears in the above-identified patent and that said Letters Patent is hereby corrected as shown below:

In the Specification:

In Column 1, Line 27, delete "sane" and insert -- same --, therefor.

Signed and Sealed this
Twenty-second Day of July, 2014

Michelle K. Lee
*Deputy Director of the United States Patent and Trademark Office*